US008146870B1

(12) United States Patent
Cooper

(10) Patent No.: US 8,146,870 B1

(45) Date of Patent: Apr. 3, 2012

(54) FOLDABLE GUITAR STAND

(75) Inventor: Daniel Lee Cooper, Nashville, TN (US)

(73) Assignee: Coopercopia, LLC, Nashville, TN (US)

(*) Notice: Subject to any disclaimer, the term of this patent is extended or adjusted under 35 U.S.C. 154(b) by 161 days.

(21) Appl. No.: 12/836,764

(22) Filed: Jul. 15, 2010

Related U.S. Application Data

(60) Provisional application No. 61/226,179, filed on Jul. 16, 2009.

(51) Int. Cl.
*F16M 11/38* (2006.01)

(52) U.S. Cl. ........... 248/166; 248/150; 248/165; 84/327

(58) Field of Classification Search .................. 248/150, 248/151, 165, 166, 121, 434, 163.1, 465, 248/447, 459, 462, 174; 211/189, 41.2; 84/327, 84/453, 421, 329
See application file for complete search history.

(56) References Cited

U.S. PATENT DOCUMENTS

| | | | | | |
|---|---|---|---|---|---|
| 1,840,620 | A | * | 1/1932 | Dennis | 248/462 |
| 3,057,591 | A | * | 10/1962 | Weimer | 248/166 |
| 3,417,954 | A | * | 12/1968 | Croninger | 248/462 |
| 4,943,021 | A | * | 7/1990 | Cien et al. | 248/167 |
| 5,350,143 | A | * | 9/1994 | Hoshino | 248/166 |
| 5,383,634 | A | | 1/1995 | Liao | |
| 5,505,413 | A | * | 4/1996 | Hennessey | 248/166 |
| 5,664,756 | A | * | 9/1997 | Liao | 248/443 |
| 5,744,735 | A | * | 4/1998 | Liao | 84/327 |
| 5,836,552 | A | * | 11/1998 | Yu | 248/166 |
| 5,957,417 | A | * | 9/1999 | Yu | 248/166 |
| 5,973,244 | A | * | 10/1999 | McCulloch | 84/327 |
| D436,465 | S | * | 1/2001 | Berkman | D6/466 |
| 6,323,406 | B1 | * | 11/2001 | Park | 84/327 |
| 6,412,742 | B1 | * | 7/2002 | Yu | 248/434 |
| 6,439,532 | B1 | * | 8/2002 | Yu | 248/443 |
| 6,533,228 | B1 | * | 3/2003 | Yu | 248/166 |
| D482,904 | S | * | 12/2003 | Slaymaker | D6/466 |
| 6,722,617 | B2 | * | 4/2004 | Wilfer | 248/163.1 |
| 7,470,843 | B2 | * | 12/2008 | Hsieh | 84/329 |
| 7,777,110 | B2 | * | 8/2010 | Wallis | 84/327 |
| 7,798,530 | B1 | * | 9/2010 | Mercado | 281/42 |
| 2005/0121567 | A1 | * | 6/2005 | Meuniot | 248/150 |

* cited by examiner

*Primary Examiner* — Nkeisha Smith

(74) *Attorney, Agent, or Firm* — Stites & Harbison, PLLC; David W. Nagle, Jr.

(57) ABSTRACT

A foldable guitar stand includes: two main support legs; two vertical support members; two rear legs; and a brace. With respect to each side of the guitar stand, one main support leg, one vertical support member, and one rear leg pivot relative to each other about a common axis defined by a pin. The first vertical support member is then operably joined to the second vertical support member by a hinge, and the brace extends between and further connects the vertical support members. In a deployed position, each of the main support legs is rotated about the respective axes defined by the pins to a position in which a substantially flat foot portion of the main support legs can engage the underlying ground surface. Each of the rear legs is rotated away from the respective main support legs to a position in which the respective foot portions can engage the underlying ground surface. The two vertical support members (which are hinged together) are then rotated into an upright orientation.

23 Claims, 18 Drawing Sheets

60
61

60b
61
60a
60

64
60b
62
61
60a
60

60b
61
60a
60

61
60

FOLDABLE GUITAR STAND

CROSS-REFERENCE TO RELATED APPLICATIONS

The present application claims priority to U.S. Provisional Patent Application Ser. No. 61/226,179 filed on Jul. 16, 2009, the entire disclosure of which is incorporated herein by reference.

TECHNICAL FIELD

The present invention relates to stands for guitars or similar musical instruments or objects.

BACKGROUND OF THE INVENTION

Guitar stands are used to support a guitar when it is not being played or stored in a case. However, it is quite typical, when a guitar stand is not easily available, to see a performer lean a guitar against a wall, table, or chair. This can often result in the guitar falling over and being damaged. Often times, carrying the most common types of guitar stands to a performance requires carrying the guitar in its case with one hand and carrying the guitar stand with the other hand. This is inconvenient, and it may be difficult for the performer to even open and pass through a door without having to set the guitar and/or the stand down.

In a typical guitar case 100 and as shown in FIGS. 1-3, there is a space 104 that is in front of the neck support 102 and under the headstock of the guitar when it is stored in the case 100. This space 104 commonly measures approximately 9"×5"×2". A portion of this space 104 is taken up by the headstock of the guitar when it is stored in the case 100, with the space 104 allowing clearance for the tuning keys during storage or transport of the guitar. While current guitar stands would not fit under the headstock of the guitar within this space 104, it would be desirable to provide a guitar stand that could fit in this space 104 under the headstock of a guitar, or perhaps in the accessory compartment, without causing harm to the guitar during storage and transport. Of course, such a guitar stand must also provide stable support for the guitar during use.

SUMMARY OF THE INVENTION

An exemplary foldable guitar stand made in accordance with the present invention includes: two main support legs; two vertical support members; two rear legs; and a brace.

Each of the main support legs includes a proximate end that defines a hole to facilitate pivotal movement of the main support leg relative to the associated vertical support member. Each main support leg also defines a recess along its inner surface at its proximate end, which engages and mates with a complementary recess defined by an associated rear leg when the guitar stand is in a storage position. Each main support leg further includes a substantially flat foot portion at its distal end that engages the underlying ground surface when the guitar stand is in a deployed position. Each main support leg also defines two support ledges along its upper surface, which terminate at a stop at the distal end of the main support leg. Furthermore, the area above the support ledges effectively defines a cavity for receiving the associated vertical support member when the guitar stand is in a storage position.

Each vertical support member has an enlarged and flattened proximate end that defines a hole. This hole is placed in registry with the corresponding hole defined through the associated main support leg. At the opposite end of each vertical support member, there is a hinge portion that is secured to the inner surface of the vertical support member. The hinge portion secured to the first vertical support member is operably connected to and engages the hinge portion secured to second vertical support member to create a butt hinge that facilitates pivotal movement of the respective vertical support members relative to one another.

Each rear leg has an enlarged and flattened proximate end that defines a hole. This hole is placed in registry with the hole defined through the associated main support leg and the hole defined through the associated vertical support member, such that a pin can be inserted through the respective holes to facilitate pivotal movement. In this regard, the enlarged and flattened proximate end of each rear leg is interposed and effectively "sandwiched" between the associated main support leg and the enlarged and flattened proximate end of the associated vertical support member. Thus, with respect to one side of the exemplary foldable guitar stand, all three of the major structural components—the main support leg, the vertical support member, and the rear leg (collectively, a first subassembly)—pivot relative to each other about a common axis defined by a first pin. Similarly, with respect to the other side of the exemplary foldable guitar stand, all three of the major structural components—the main support leg, the vertical support member, and the rear leg (collectively, a second subassembly)—pivot relative to each other about a common axis defined by a second pin.

Furthermore, each rear leg also includes a foot portion at its distal end. Each rear leg also defines a recess along its outer surface that extends from the proximate end to the distal end. This recess engages and mates with a complementary recess defined by the main support leg when the guitar stand is in a storage position.

Finally, the brace extends between and connects the vertical support members.

In a deployed position, each of the main support legs is rotated about the respective axes defined by the pins to a position in which a substantially flat foot portion at the respective distal ends of the main support legs can engage the underlying ground surface. At the same time, each of the rear legs is rotated away from the associated main support leg to a position in which the foot portion can engage the underlying ground surface. The two vertical support members (which are hinged together) are then rotated into an upright orientation. Finally, the guitar stand can be spread open, with the brace used to fix the guitar stand into the deployed position. Once in the deployed position, the exemplary foldable guitar stand provides a stable support for a guitar or other instrument.

To return the guitar stand to a storage position, the brace is unlocked or released. The two vertical support members (which are hinged together) are folded together into an abutting relationship, and then are rotated downward and are received in the cavities defined above the respective support ledges of the main support legs. The rear legs are then rotated toward and into engagement with the respective main support leg. Specifically, the recess defined along the outer surface of each rear leg engages and mates with the complementary recess defined by the associated main support leg, such that each rear leg is nestled into and fits snugly against the associated main support leg. Once in the storage position, the exemplary foldable guitar stand can fit in the space that is in front of the neck support and under the headstock of the guitar when it is stored in the guitar case.

DETAILED DESCRIPTION OF THE INVENTION

The present invention is a foldable guitar stand.

Figure 4:
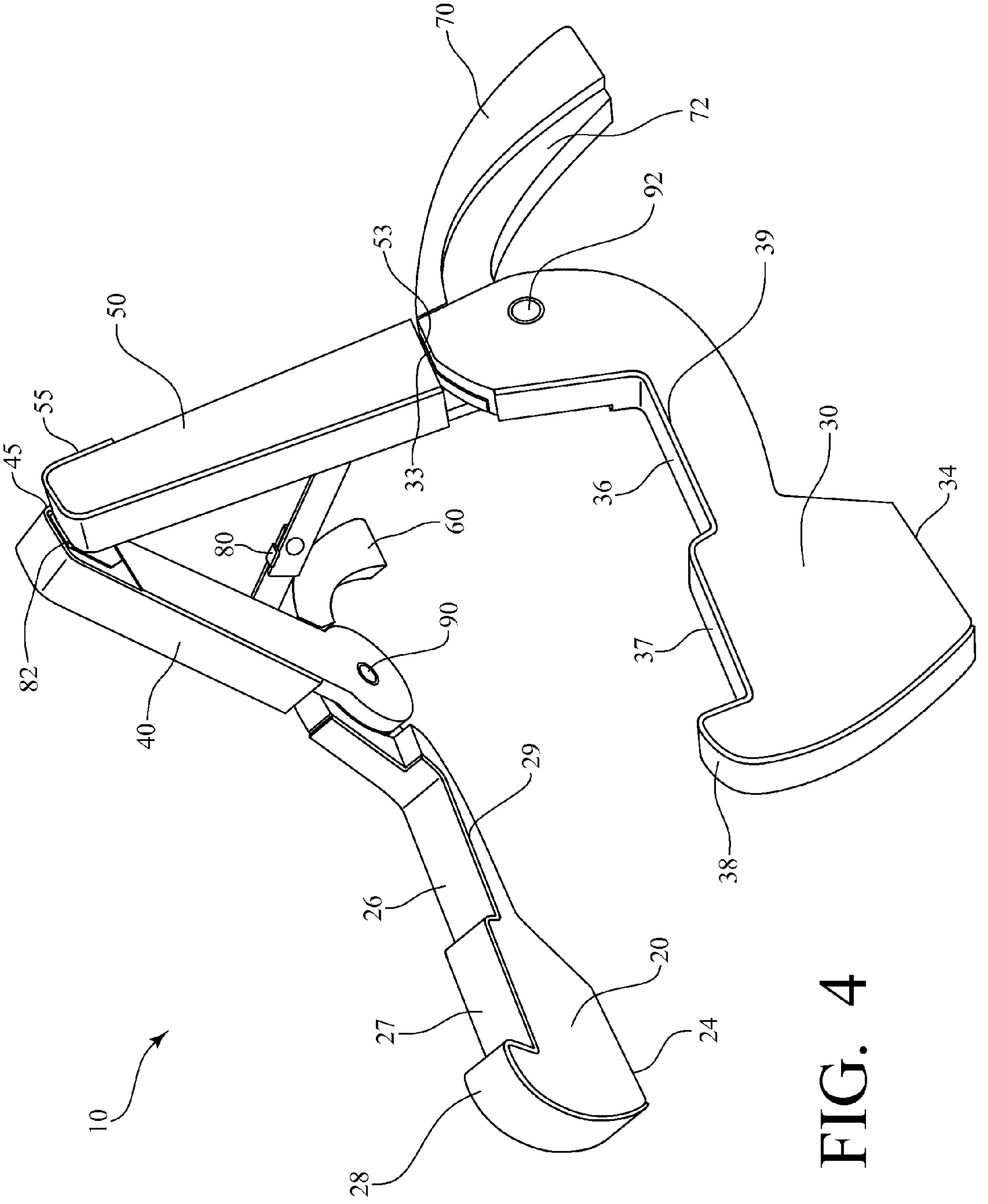
FIG. 4 is a perspective view of an exemplary guitar stand made in accordance with the present invention in a deployed position.
Figure 5:
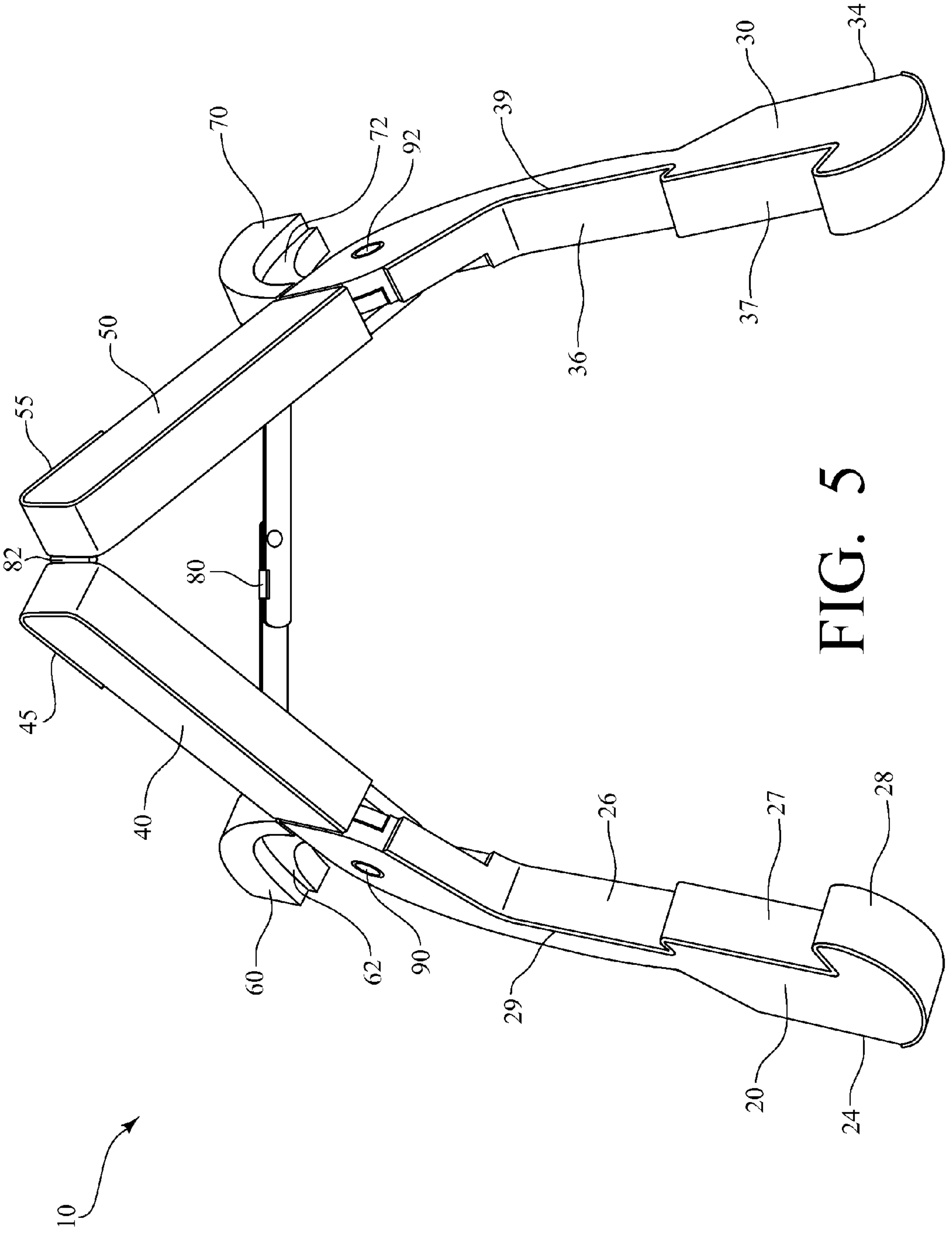
FIG. 5 is a front view of the exemplary guitar stand of FIG. 4 in the deployed position.
Figure 6:
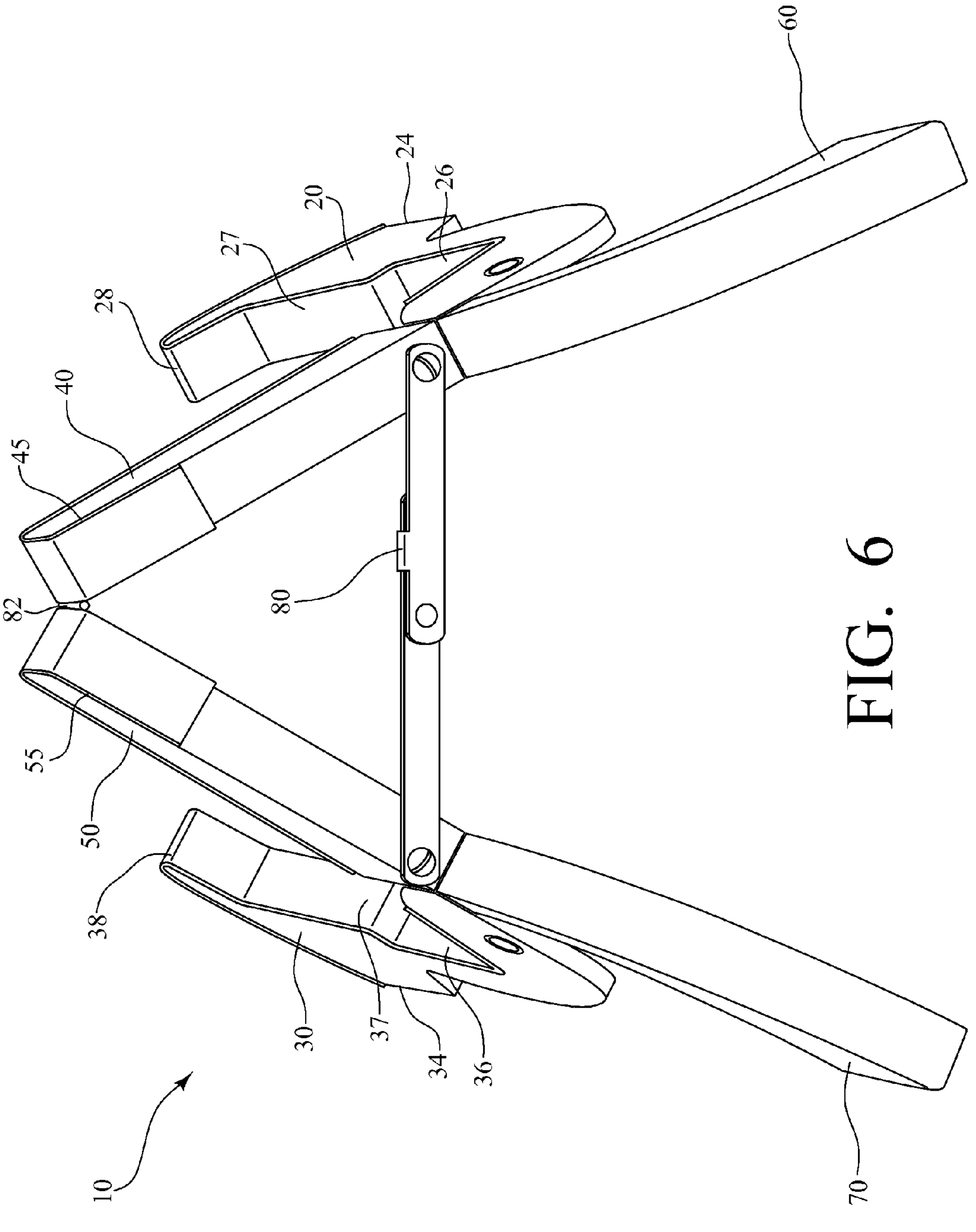
FIG. 6 is a rear view of the exemplary guitar stand of FIG. 4 in the deployed position.
Figures 7A, 7B, 7C:
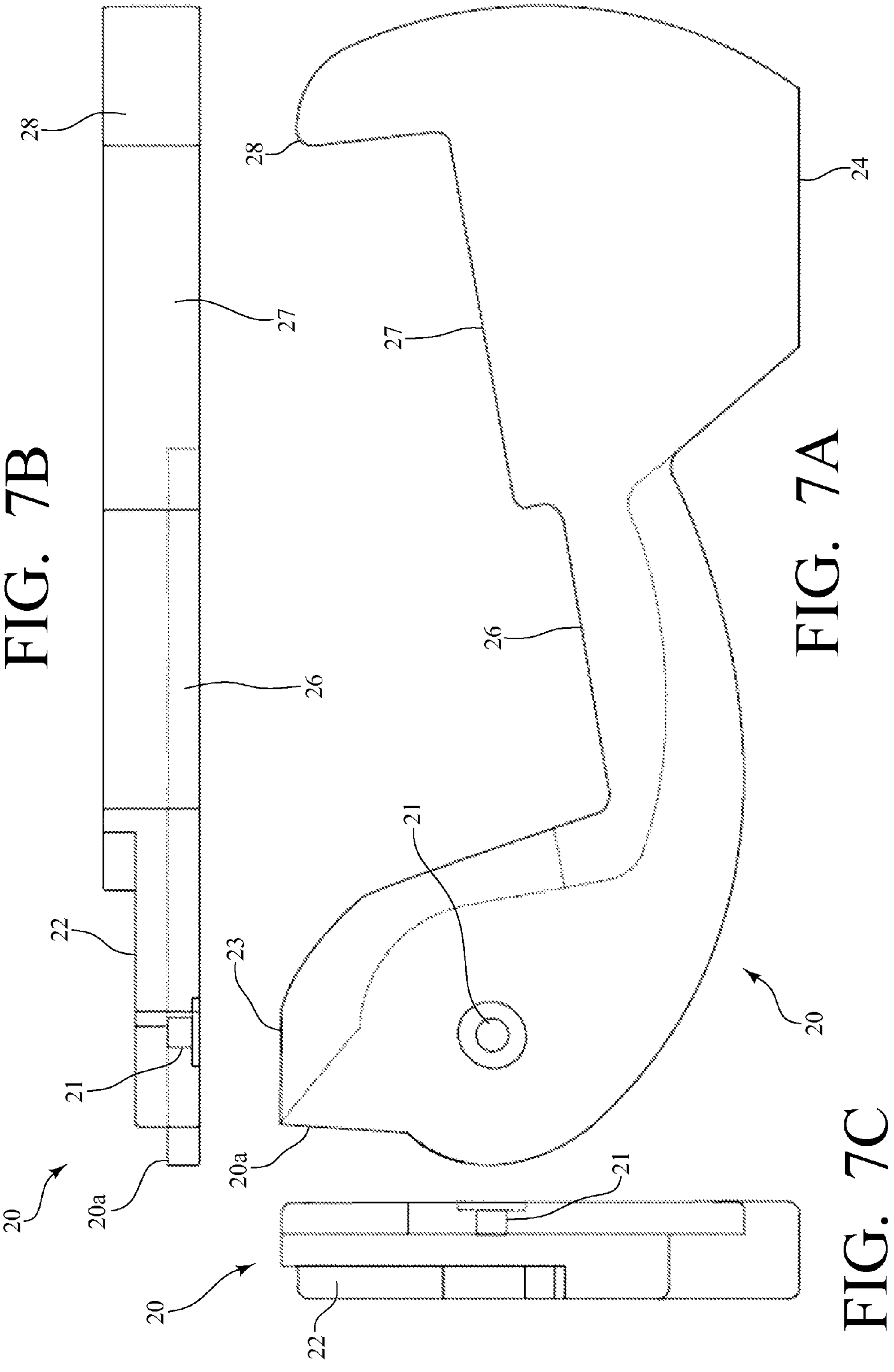
FIG. 7A is a side (outside) view of one of the main support legs of the exemplary guitar stand of FIG. 4.
FIG. 7B is a top view of the main support leg of FIG. 7A.
FIG. 7C is a rear view of the main support leg of FIG. 7A.
Figures 7D, 7E, 7F:
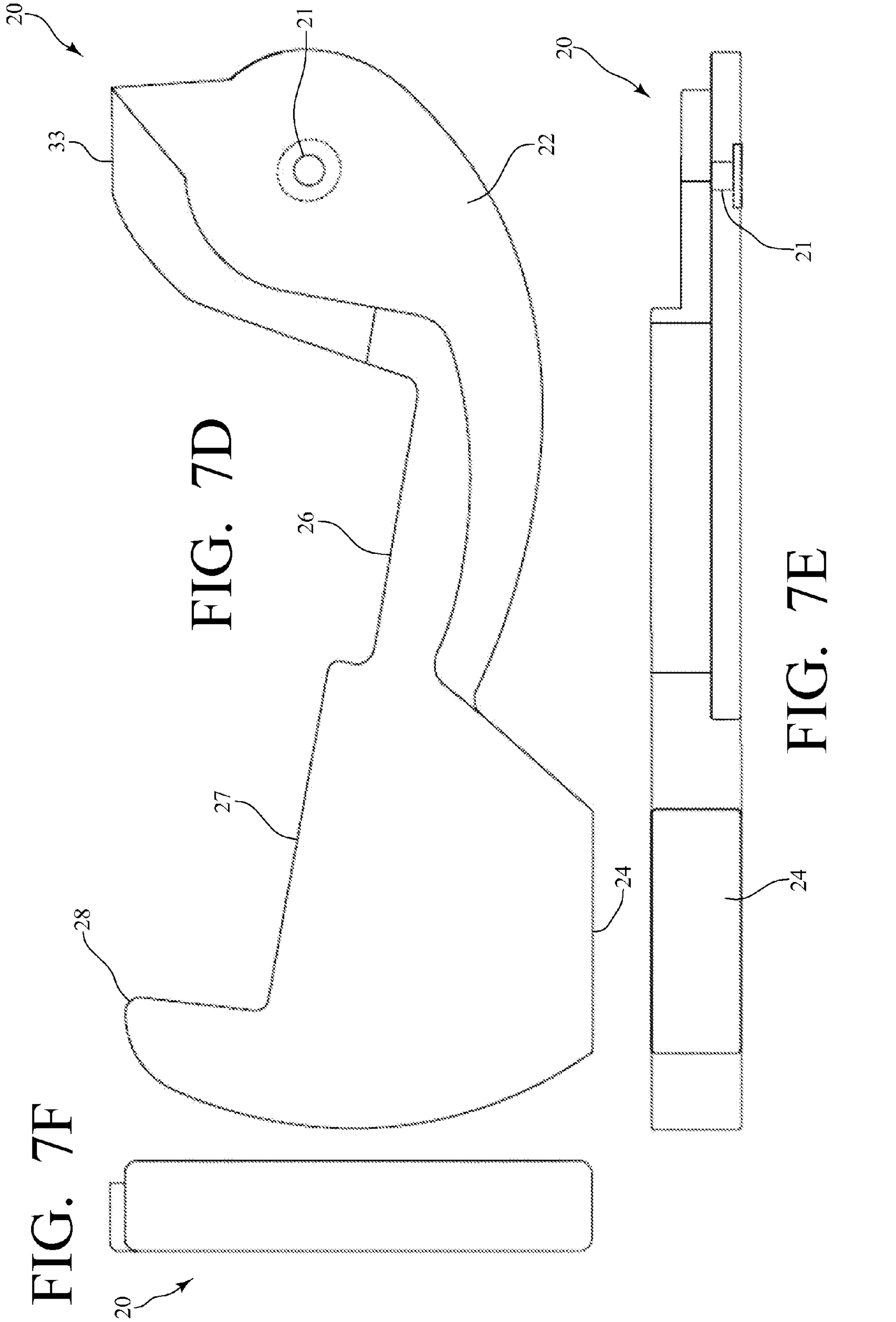
FIG. 7D is a side (inside) view of the main support leg of FIG. 7A.
FIG. 7E is a bottom view of the main support leg of FIG. 7A.
FIG. 7F is a front view of the main support leg of FIG. 7A.
Figures 8A, 8B, 8C:
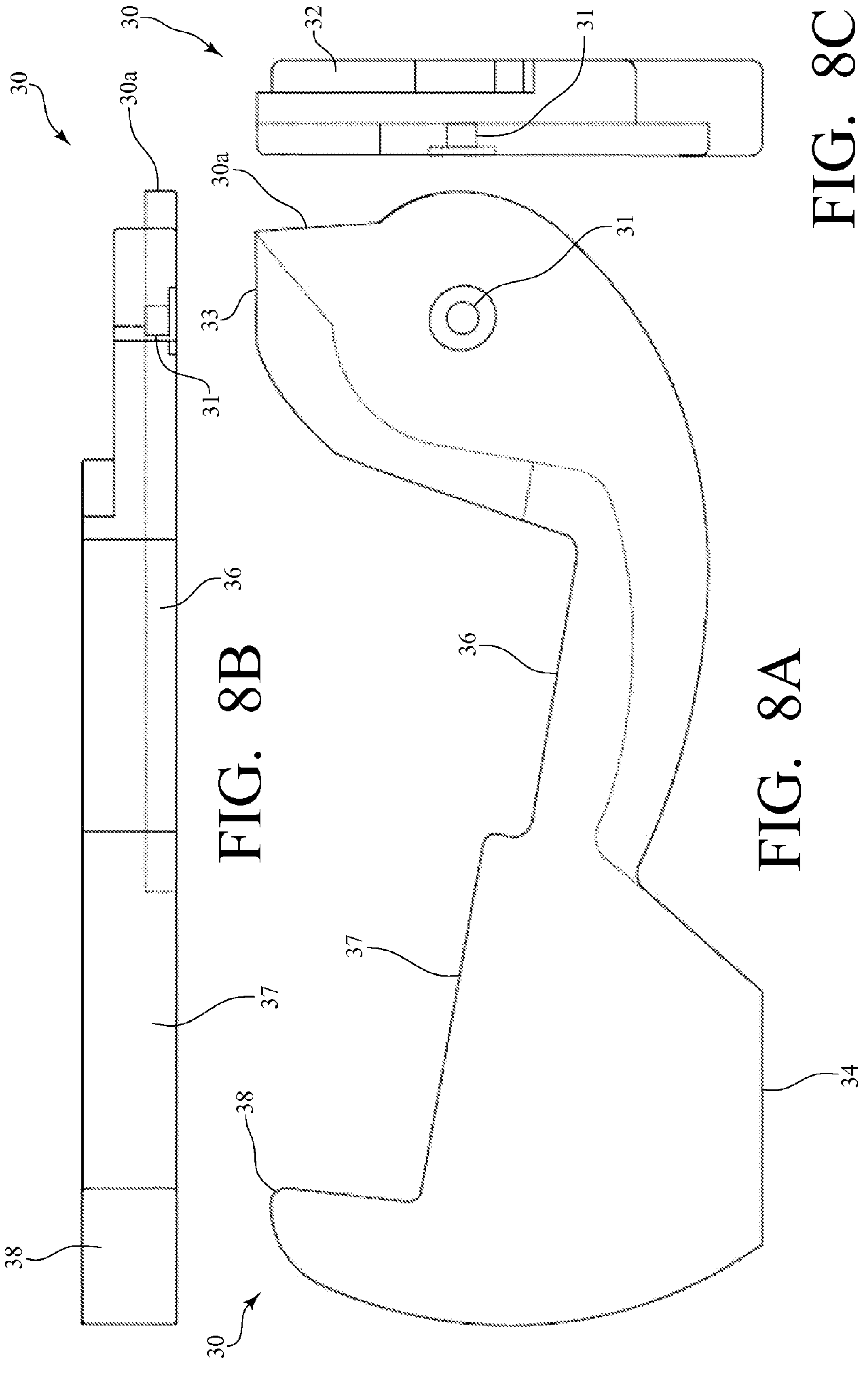
FIG. 8A is a side (outside) view of the other of the main support legs of the exemplary guitar stand of FIG. 4.
FIG. 8B is a top view of the main support leg of FIG. 8A.
FIG. 8C is a rear view of the main support leg of FIG. 8A.
Figures 8D, 8E, 8F:
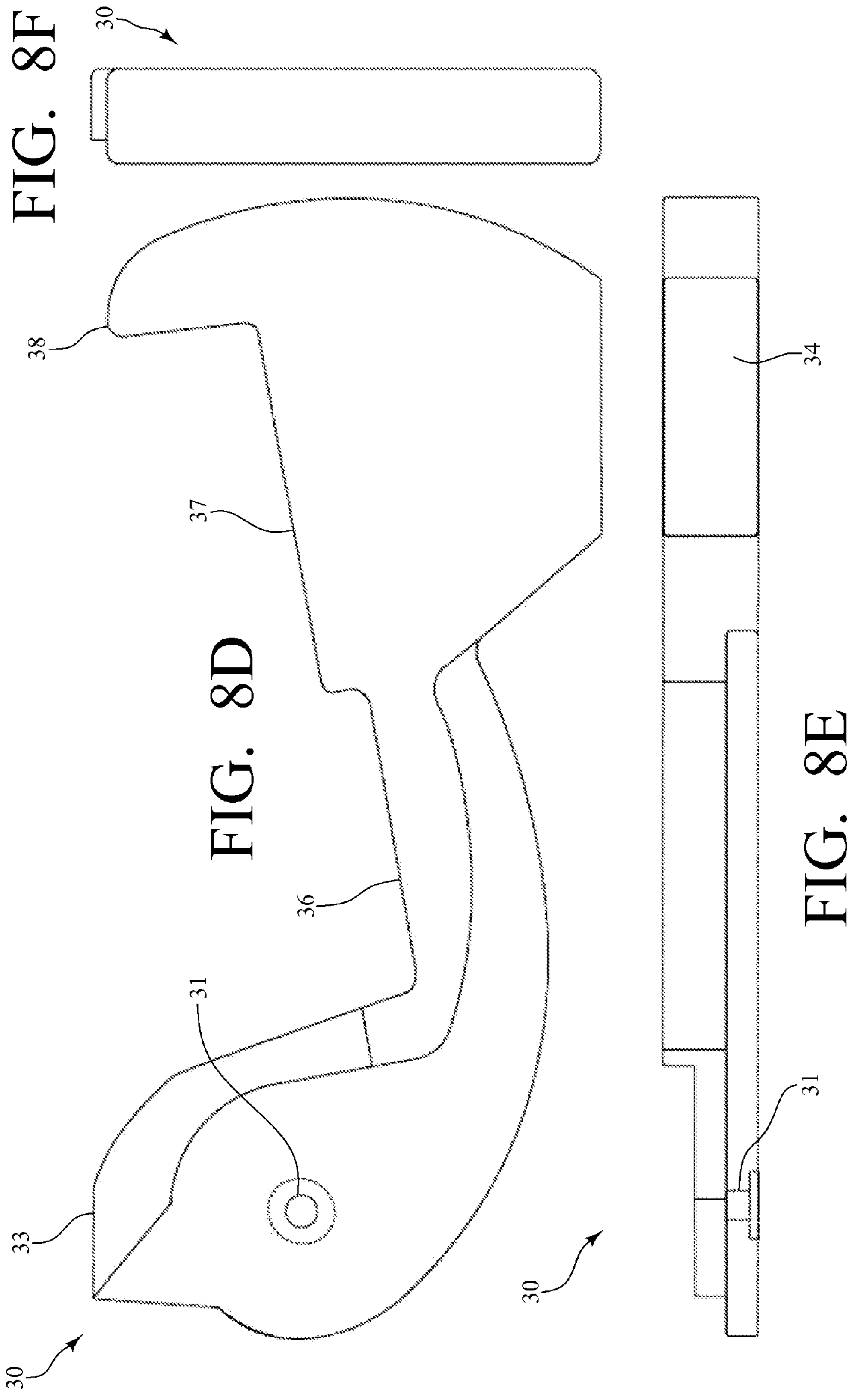
FIG. 8D is a side (inside) view of the main support leg of FIG. 8A.
FIG. 8E is a bottom view of the main support leg of FIG. 8A.
FIG. 8F is a front view of the main support leg of FIG. 8A.
Figures 9A, 9B, 9E, 9F:
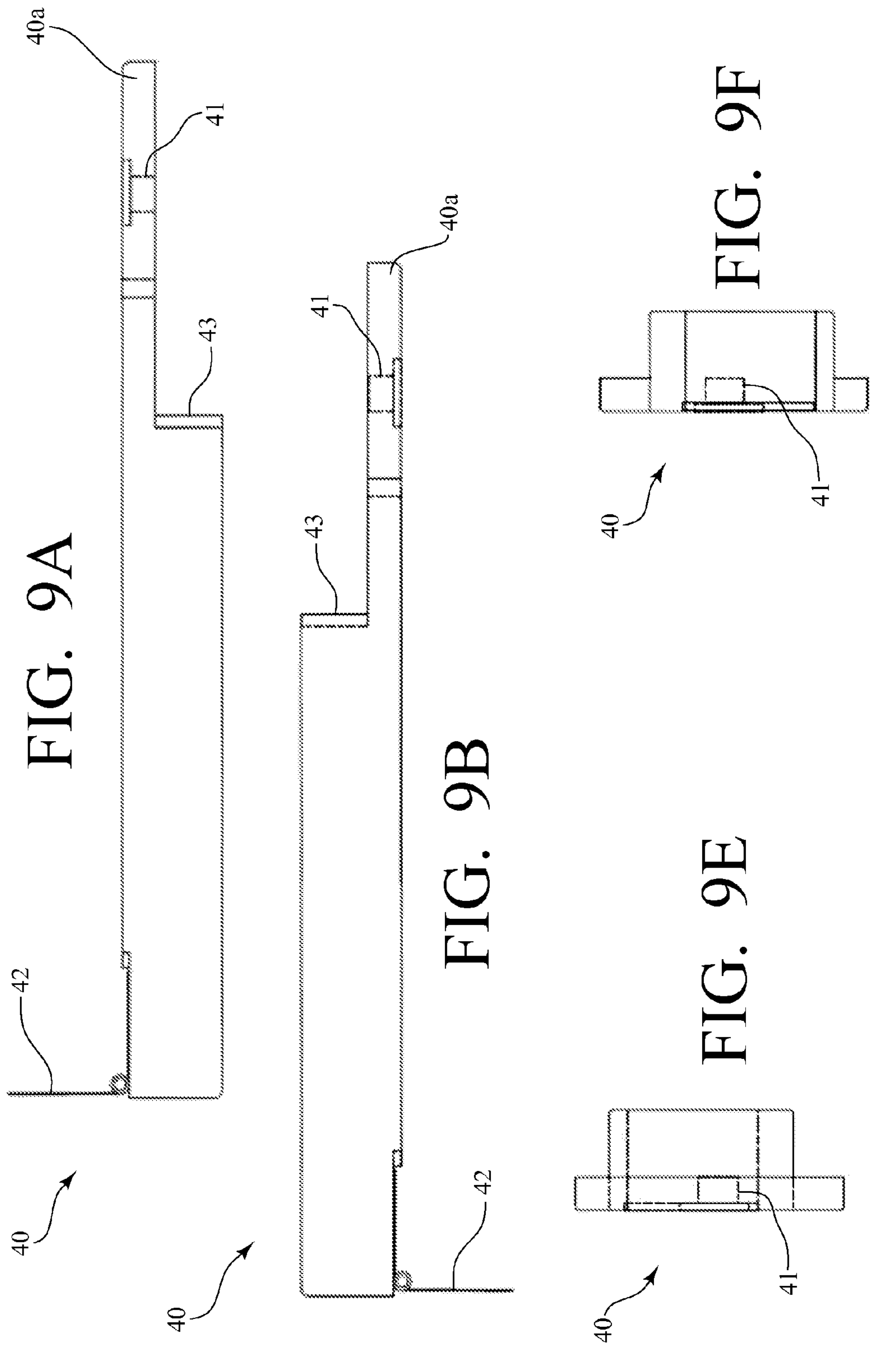
FIG. 9A is a side view of one of the vertical support members of the exemplary guitar stand of FIG. 4.
FIG. 9B is another side view of the vertical support member of FIG. 9A.
FIG. 9E is an end view of the vertical support member of FIG. 9A.
FIG. 9F is an opposite end view of the vertical support member of FIG. 9A.
Figure 9C:
FIG. 9C is a plan view (outside surface) of the vertical support member of FIG. 9A.
Figure 9D:
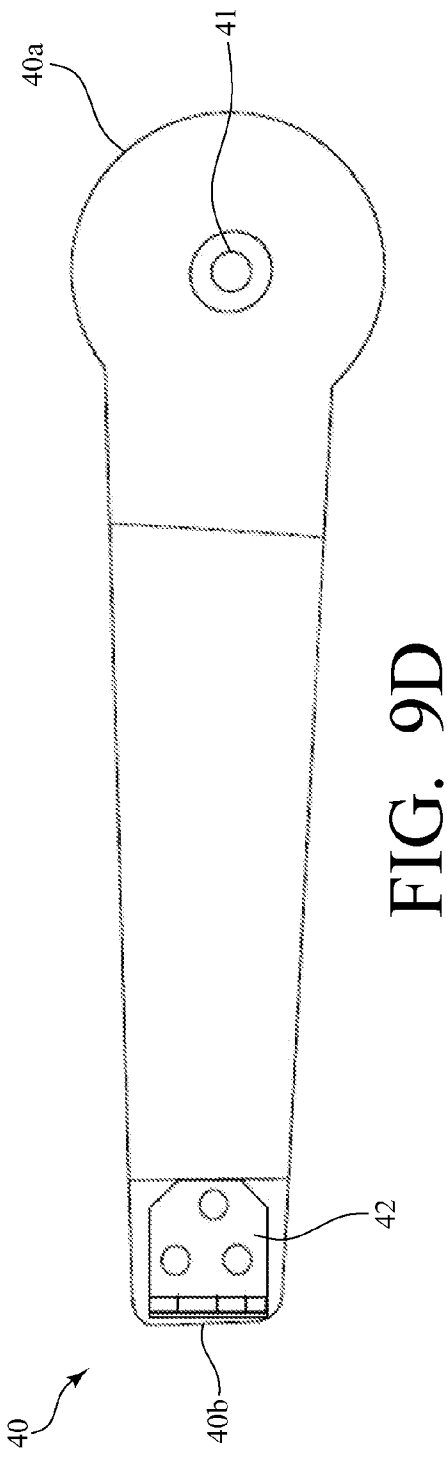
FIG. 9D is another plan view (inside surface) of the vertical support member of FIG. 9A.
Figures 10A, 10B, 10E, 10F:
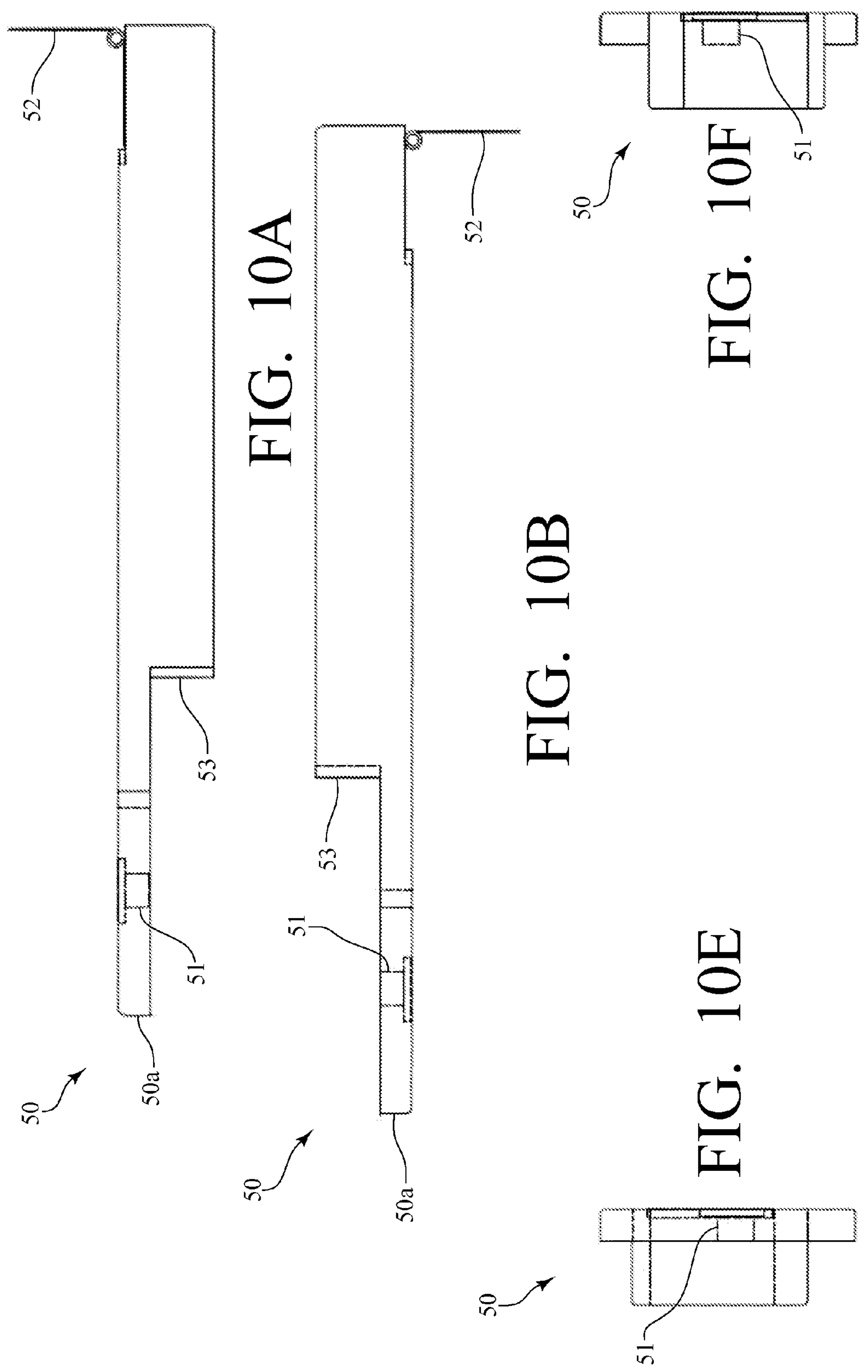
FIG. 10A is a side view of the other of the vertical support members of the exemplary guitar stand of FIG. 4.
FIG. 10B is another side view of the vertical support member of FIG. 10A.
FIG. 10E is an end view of the vertical support member of FIG. 10A.
FIG. 10F is an opposite end view of the vertical support member of FIG. 10A.
Figure 10C:
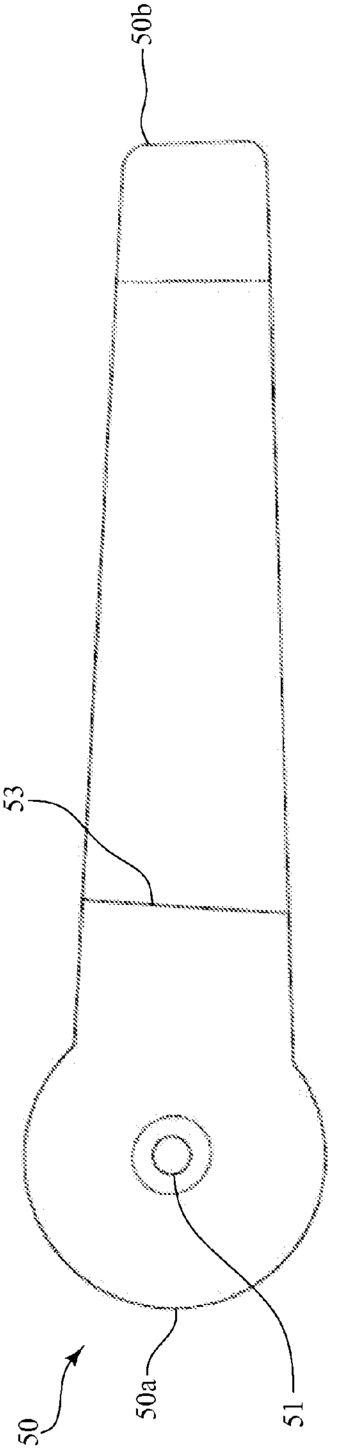
FIG. 10C is a plan view (outside surface) of the vertical support member of FIG. 10A.
Figure 10D:
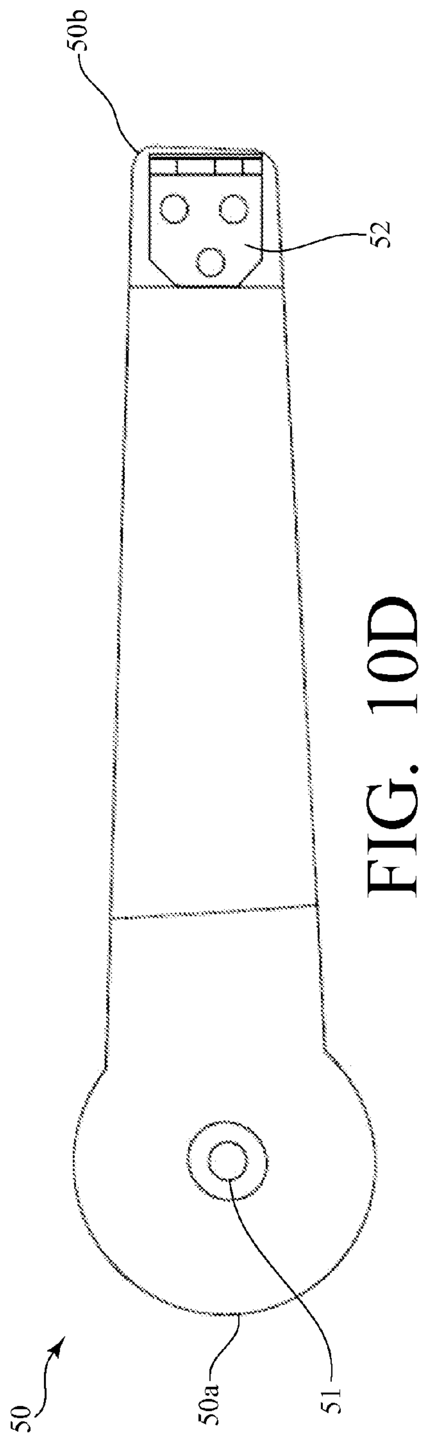
FIG. 10D is another plan view (inside surface) of the vertical support member of FIG. 10A.
Figures 11A, 11B, 11C, 11D, 11E:
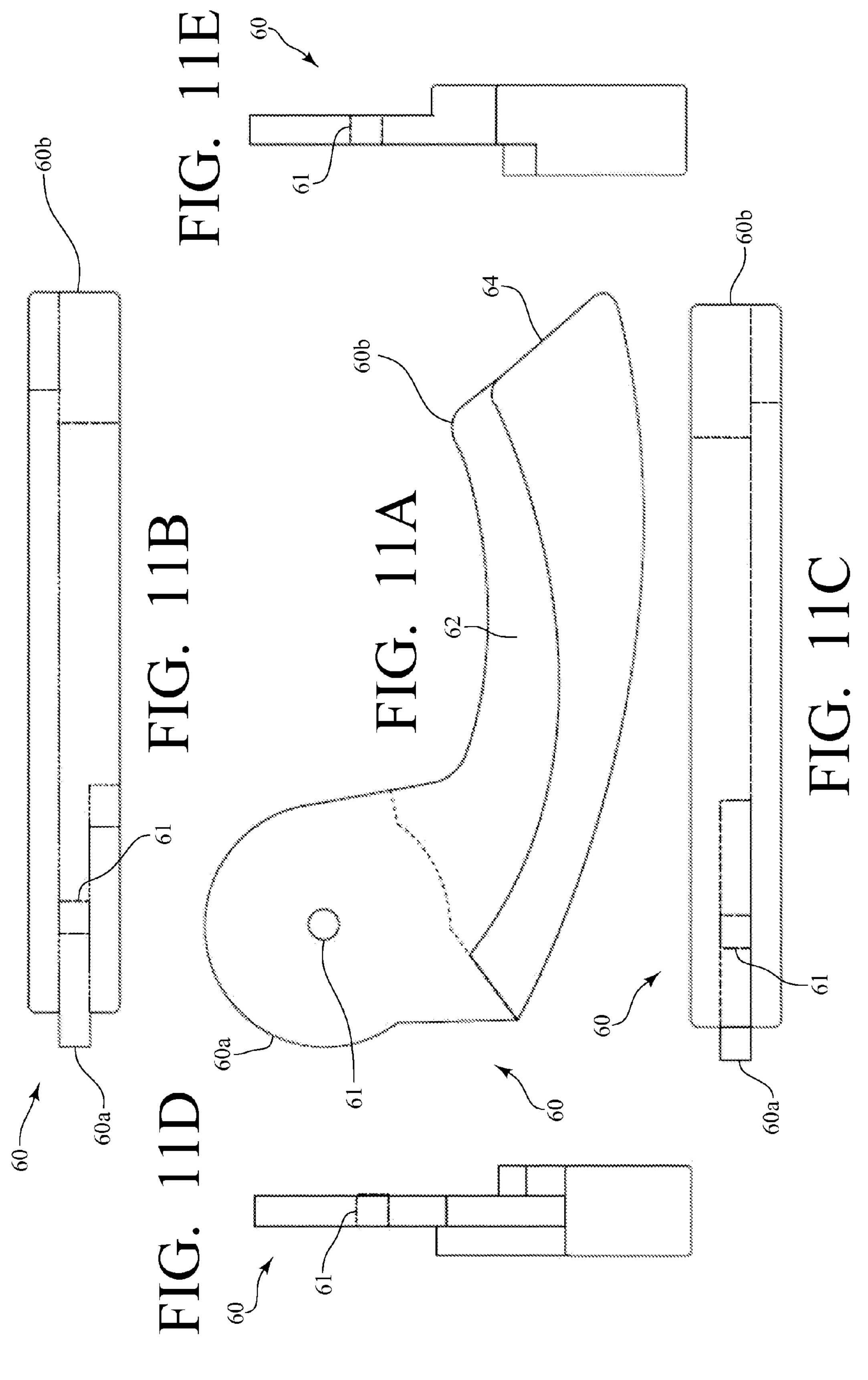
FIG. 11A is a plan view (outside surface) of one of the rear legs of the exemplary guitar stand of FIG. 4.
FIG. 11B is a top view of the rear leg based on FIG. 11A.
FIG. 11C is a bottom view of the rear leg based on FIG. 11A.
FIG. 11D is a side view of the rear leg based on FIG. 11A.
FIG. 11E is another side view of the rear leg based on FIG. 11A.
Figures 11F, 11G, 11H, 11I, 11J:
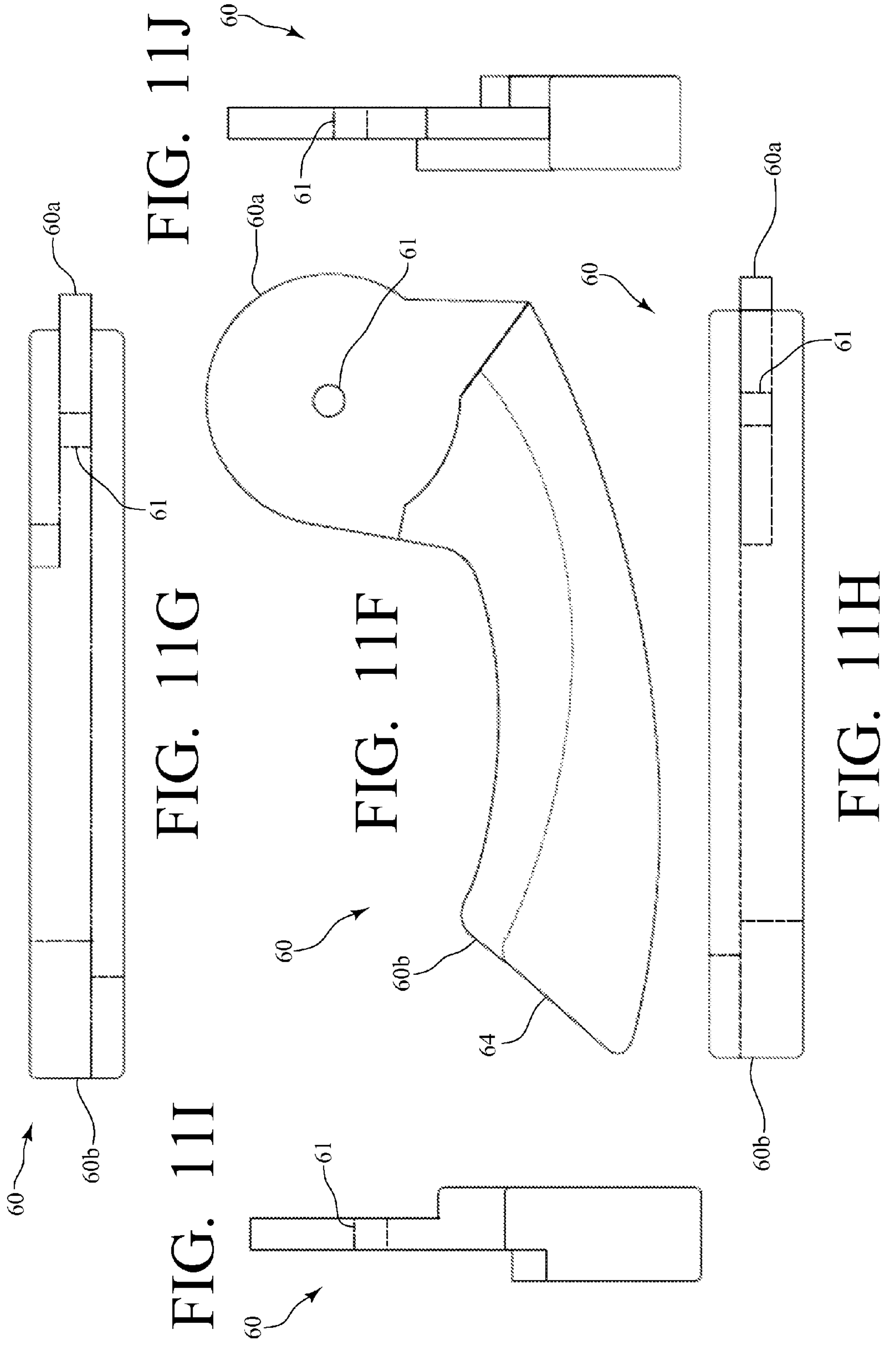
FIG. 11F is a plan view (inside surface) of the rear leg of FIG. 11A.
FIG. 11G is a top view of the rear leg based on FIG. 11F.
FIG. 11H is a bottom view of the rear leg based on FIG. 11F.
FIG. 11I is a side view of the rear leg based on FIG. 11F.
FIG. 11J is another side view of the rear leg based on FIG. 11F.
Figures 12A, 12B, 12C, 12D, 12E:
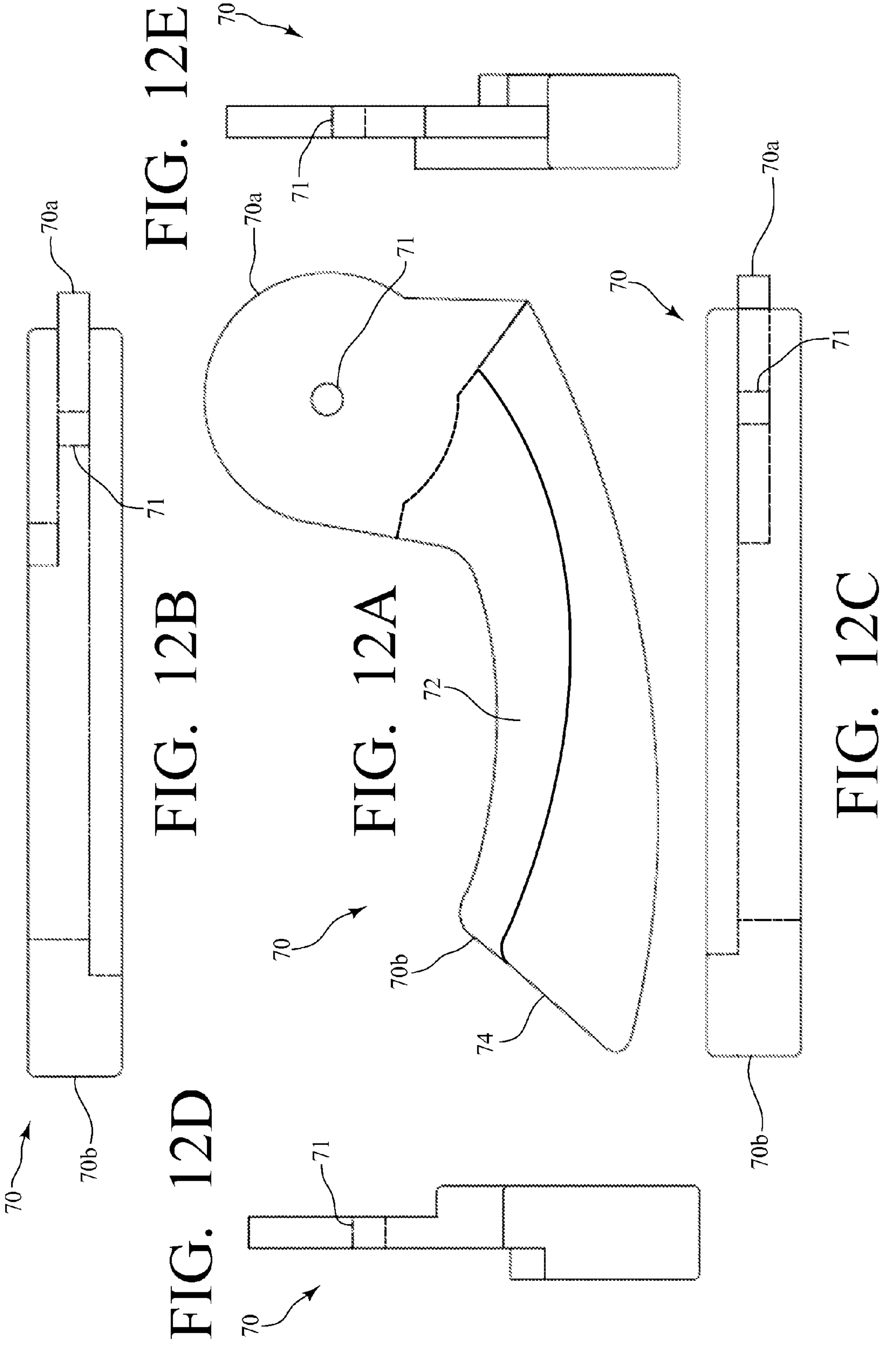
FIG. 12A is a plan view (outside surface) of the other of the rear legs of the exemplary guitar stand of FIG. 4.
FIG. 12B is a top view of the rear leg based on FIG. 12A.
FIG. 12C is a bottom view of the rear leg based on FIG. 12A.
FIG. 12D is a side view of the rear leg based on FIG. 12A.
FIG. 12E is another side view of the rear leg based on FIG. 12A.
Figures 12F, 12G, 12H, 12I, 12J:
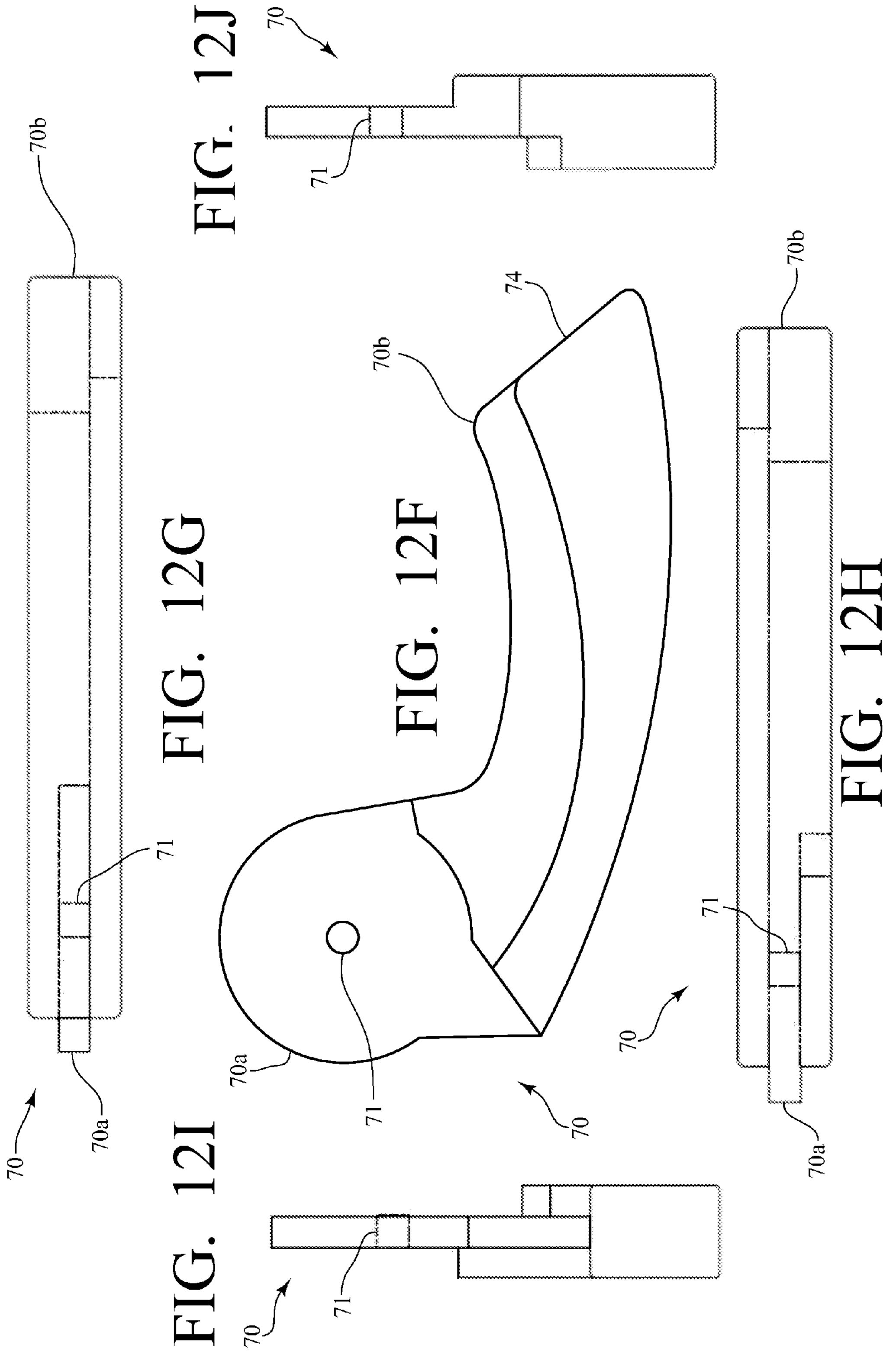
FIG. 12F is a plan view (inside surface) of the rear leg of FIG. 12A.
FIG. 12G is a top view of the rear leg based on FIG. 12F.
FIG. 12H is a bottom view of the rear leg based on FIG. 12F.
FIG. 12I is a side view of the rear leg based on FIG. 12F.
FIG. 12J is another side view of the rear leg based on FIG. 12F.

FIGS. 4, 5, and 6 are views of an exemplary foldable guitar stand 10 made in accordance with the present invention. As shown in FIGS. 4, 5, and 6, the exemplary foldable guitar stand 10 includes: two main support legs 20, 30; two vertical support members 40, 50; two rear legs 60, 70; and a brace 80.

FIGS. 7A-7F are various views of one of the main support legs 20 of the exemplary foldable guitar stand 10. As shown, the main support leg 20 includes a proximate end 20*a* that defines a hole 21 to facilitate pivotal movement of the main support leg 20 relative to the vertical support member 40, as is further described below. The main support leg 20 also defines a recess 22 along its inner surface at its proximate end 20*a*, which engages and mates with a complementary recess 62 defined by the rear leg 60 when the guitar stand 10 is in a storage position, as is further described below. The main support leg 20 further includes a substantially flat foot portion 24 at its distal end that engages the underlying ground surface when the guitar stand 10 is in a deployed position. The main support leg 20 also defines two support ledges 26, 27 along its upper surface, which terminate at a stop 28 at the distal end of the main support leg 20. Furthermore, the area above the support ledges 26, 27 effectively defines a cavity for receiving the vertical support member 40 when the guitar stand 10 is in a storage position, as is further described below. Also, although not shown in FIGS. 7A-7F, one or more protective strips (as indicated by reference numeral 29 in FIGS. 4 and 5) could be applied to upper surfaces of the main support leg 20, including the support ledges 26, 27. Such protective strips 29 could be made of rubber or other suitable material to provide additional support to a guitar and to prevent the guitar stand 10 from damaging the guitar.

FIGS. 8A-8F are various views of the other of the main support legs 30 of the exemplary foldable guitar stand 10. As shown, the main support leg 30 is substantially identical to the other main support leg 20 and includes a proximate end 30*a* that defines a hole 31 to facilitate pivoting of the main support leg 30 relative to the vertical support member 50, as is further described below. The main support leg 30 also defines a recess 32 along its inner surface at its proximate end 30*a*, which engages and mates with a complementary recess 72 defined by the rear leg 70 when the guitar stand 10 is in a storage position, as is further described below. The main support leg 30 further includes a substantially flat foot portion 34 at its distal end that engages the underlying ground surface when the guitar stand 10 is in a deployed position. The main support leg 30 also defines two support ledges 36, 37 along its upper surface, which terminate at a stop 38 at the distal end of the main support leg 30. Furthermore, the area above the support ledges 36, 37 effectively defines a cavity for receiving the vertical support member 50 in a storage position, as is further described below. Also, although not shown in FIGS. 8A-8F, one or more protective strips (as indicated by reference numeral 39 in FIGS. 4 and 5) could be applied to upper surfaces of the main support leg 30, including the support ledges 36, 37. Such protective strips 39 could be made of rubber or other suitable material to provide additional support to a guitar and to prevent the guitar stand 10 from damaging the guitar.

FIGS. 9A-9F are various views of one of the vertical support members 40 of the exemplary foldable guitar stand 10. As shown, the vertical support member 40 has an enlarged and flattened proximate end 40*a* that defines a hole 41. This hole 41 is placed in registry with the corresponding hole 21 defined through the main support leg 20, such that a pin 90 (as shown in FIGS. 4 and 5) can be inserted through the respective holes 41, 21 to facilitate pivotal movement of the main support leg 20 relative to the vertical support member 40, as is further described below. At the opposite end 40*b* of the vertical support member 40, there is a hinge portion 42 that is secured to the inner surface of the vertical support member 40. Finally, although not shown in FIGS. 9A-9F, one or more protective strips (as indicated by reference numeral 45 in FIGS. 4, 5 and 6) could be applied the upper end of the vertical support member 50. Such protective strips 45 could be made of rubber or other suitable material to provide additional support to a guitar and to prevent the guitar stand 10 from damaging the guitar.

FIGS. 10A-10F are various views of the other of the vertical support members 50 of the exemplary foldable guitar stand 10. As shown, the vertical support member 50 is substantially identical to the other vertical support member 40 and has an enlarged and flattened proximate end 50*a* that defines a hole 51. This hole 51 is placed in registry with the corresponding hole 31 defined through the main support leg 30, such that a pin 92 (as shown in FIGS. 4 and 5) can be inserted through the respective holes 51, 31 to facilitate pivotal movement of the main support leg 30 relative to the vertical support member 50, as is further described below. At the opposite end 50*b* of the vertical support member 50, there is a hinge portion 52 that is secured to the inner surface of the vertical support member 50. The hinge portion 42 secured to the first vertical support member 40 is operably connected to and engages the hinge portion 52 secured to second vertical support member 50 to create a butt hinge (which is indicated by reference numeral 82 in FIGS. 4, 5, and 6) that facilitates pivotal movement of the respective vertical support members 40, 50 relative to one another. Finally, although not shown in FIGS. 10A-10F, one or more protective strips (as indicated by reference numeral 55 in FIGS. 4, 5 and 6) could be applied the upper end of the vertical support member 50. Such protective strips 55 could be made of rubber or other suitable material to provide additional support to a guitar and to prevent the guitar stand 10 from damaging the guitar.

FIGS. 11A-11J are various views of one of the rear legs 60 of the exemplary foldable guitar stand 10. As shown, the rear leg 60 has an enlarged and flattened proximate end 60*a* that defines a hole 61. This hole 61 is placed in registry with the hole 21 defined through the main support leg 20 and the hole 41 defined through the vertical support member 40, such that a pin 90 (as shown in FIGS. 4 and 5) can be inserted through the respective holes 61, 41, 21 to facilitate pivotal movement. In this regard, the enlarged and flattened proximate end 60*a* of the rear leg 60 is interposed and effectively "sandwiched" between the main support leg 20 and the enlarged and flattened proximate end 40*a* of the vertical support member 40. Thus, with respect to one side of the exemplary foldable guitar stand 10, all three of the major structural components—the main support leg 20, the vertical support member 40, and the rear leg 60 (collectively, a first subassembly)—pivot relative to each other about a common axis defined by the pin 90.

Referring still to FIGS. 11A-11J, the rear leg 60 also includes a foot portion 64 at its distal end 60*b*. Furthermore, the rear leg 60 defines a recess 62 along its outer surface that extends from the proximate end 60*a* to the distal end 60*b*. This recess 62 engages and mates with a complementary recess 22 defined by the main support leg 20 when the guitar stand 10 is in a storage position, as is further described below.

FIGS. 12A-12J are various views of the other of the of the rear legs 70 of the exemplary foldable guitar stand 10. As shown, the rear leg 70 is substantially identical to the other rear leg 60 and has an enlarged and flattened proximate end 70*a* that defines a hole 71. This hole 71 is placed in registry with the hole 31 defined through the main support leg 30 and the hole 51 defined through the vertical support member 50, such that a pin 92 (as shown in FIGS. 4 and 5) can be inserted through the respective holes 71, 51, 31 to facilitate pivotal movement. In this regard, the enlarged and flattened proximate end 70*a* of the rear leg 70 is interposed and effectively "sandwiched" between the main support leg 30 and the enlarged and flattened proximate end 50*a* of the vertical support member 50. Thus, with respect to the other side of the exemplary foldable guitar stand 10, all three of the major structural components—the main support leg 30, the vertical support member 50, and the rear leg 70 (collectively, a second subassembly)—pivot relative to each other about a common axis defined by the pin 92.

Referring still to FIGS. 12A-12J, the rear leg 70 also includes a foot portion 74 at its distal end 70*b*. Furthermore, the rear leg 70 defines a recess 72 along its outer surface that extends from the proximate end 70*a* to the distal end 70*b*. This recess 72 engages and mates with a complementary recess 32 defined by the main support leg 30 when the guitar stand 10 is in a storage position, as is further described below.

Again, as discussed above, on one side of the exemplary foldable guitar stand 10, the major structural components—the main support leg 20, the vertical support member 40, and the rear leg 60—pivot relative to each other about a common axis defined by the pin 90. On the other side of the exemplary foldable guitar stand 10, the major structural components—the main support leg 30, the vertical support member 50, and the rear leg 70—pivot relative to each other about a common axis defined by the pin 92. With respect to such pins 90, 92, various known mechanical connectors could be used without departing from the spirit and scope of the present invention, including, for example, a screw post or a Chicago screw. The two sides of the exemplary foldable guitar stand 10 are then operably joined together by the butt hinge 82 that connects the respective ends 40*b*, 50*b* of the vertical support members 40, 50. Furthermore, the brace 80 extends between and connects the vertical support members 40, 50, as is further described below. Although one exemplary brace 80 is shown in the Figures, various other braces or mechanical means for connecting the vertical support members 40, 50 to one another, including a locking brace or some form of adjustable brace, could be used without departing from the spirit and scope of the present invention.

Figure 13:
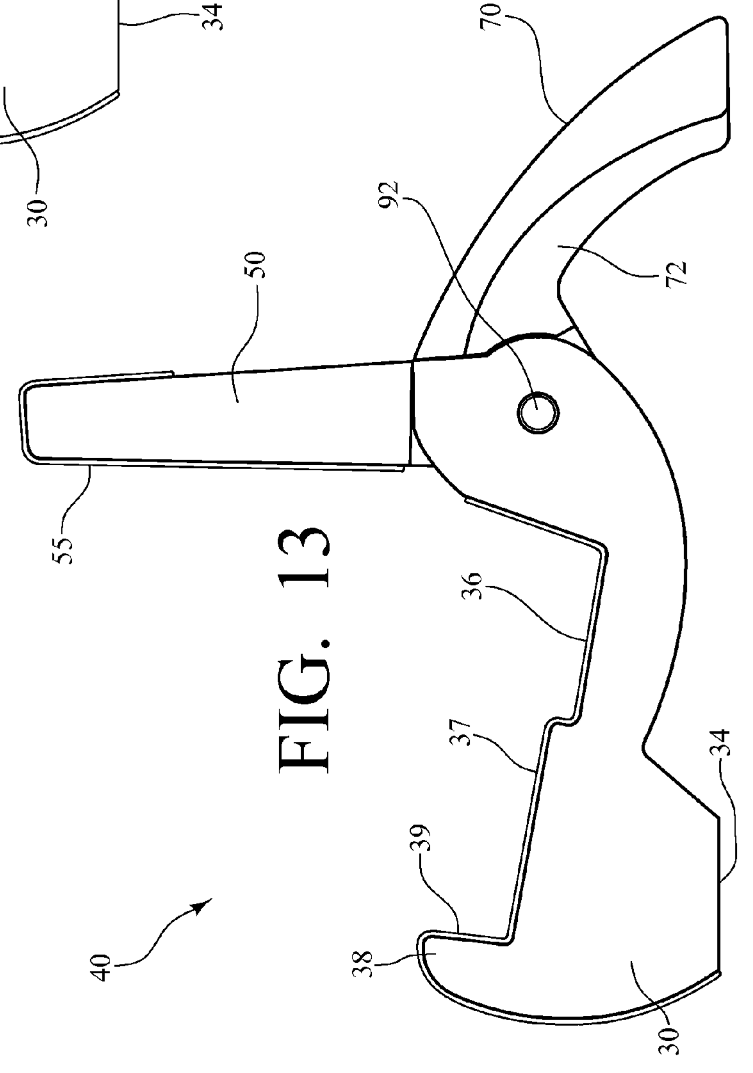
FIG. 13 is a side view of the exemplary guitar stand of FIG. 4 in a deployed position.

Referring again to FIGS. 4, 5, and 6, and the side view of FIG. 13, in a deployed position, each of the main support legs 20, 30 is rotated about the respective axes defined by the pins 90, 92 to a position in which the substantially flat foot portion 24, 34 at the respective distal ends of the main support legs 20, 30 can engage the underlying ground surface. At the same time, each of the rear legs 60, 70 is rotated counterclockwise and away from the main support legs 20, 30 about the respective axes defined by the pins 90, 92 to a position in which the respective foot portions 64, 74 can engage the underlying ground surface. The two vertical support members 40, 50 (which are hinged together) are then rotated into an upright orientation. In this regard, each of the vertical support members 40, 50 defines a surface 43, 53 that is configured to engage a corresponding surface 23, 33 defined by the respective main support leg 20, 30 at its proximate end 20*a*, 30*a*, thus locking the two vertical support members 40, 50 into the upright orientation when the guitar stand is in a deployed position. Finally, the guitar stand 10 can be spread open, with the brace 80 used to fix the guitar stand 10 into the deployed position.

Figure 4A:
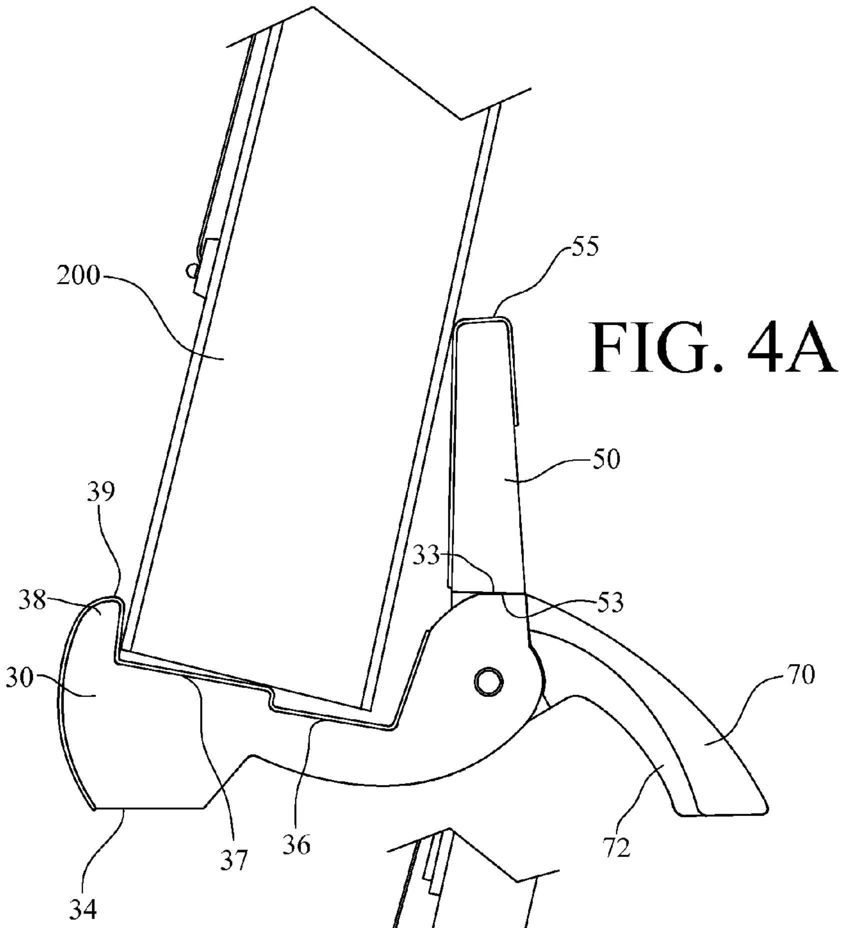
FIG. 4A is a side view of the exemplary guitar stand of FIG. 4 in the deployed position and supporting an acoustic guitar.
Figure 4B:
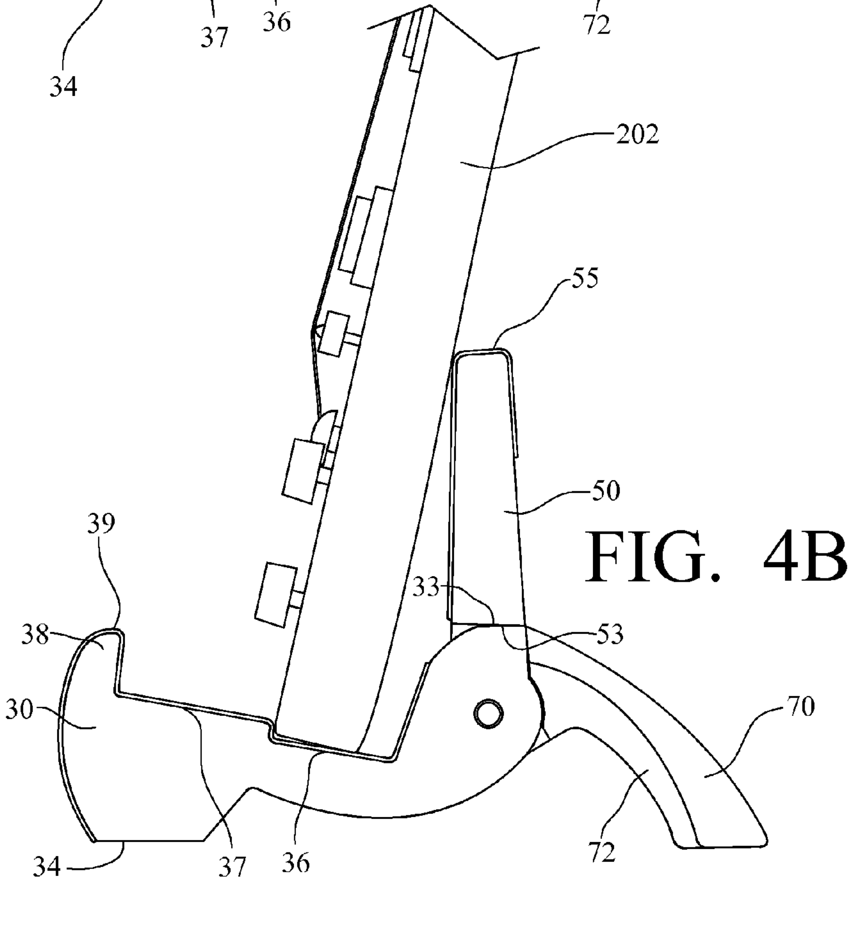
FIG. 4B is a side view of the exemplary guitar stand of FIG. 4 in the deployed position and supporting an electric guitar.

Once in the deployed position, the exemplary foldable guitar stand 10 provides a stable support for a guitar. As shown in FIG. 4A, the guitar stand 10 can accommodate an acoustic guitar 200, with the acoustic guitar 200 extending across and being supported on the support ledges 27, 37 of the respective main support legs 20, 30 (only one of which is viewable in FIG. 4A). As also shown in FIG. 4A, the acoustic guitar 200 is inclined slightly backward, resting against the vertical support members 40, 50 (only one of which is viewable in FIG. 4A), while the stops 28, 38 at the distal ends of the respective main support legs 20, 30 prevent the guitar 200 from sliding any further forward. As shown in FIG. 4B, the guitar stand 10 can also accommodate an electric guitar 202 (or perhaps another instrument such as a banjo), with the electric guitar 202 extending across and being supported on the support ledges 26, 36 of the respective main support legs 20, 30 (only one of which is viewable in FIG. 4B). As also shown in FIG. 4B, the electric guitar 202 is inclined slightly backward, resting against the vertical support members 40, 50 (only one of which is viewable in FIG. 4B), while the "steps" between the first set of supports ledges 26, 36 and the second set of ledges 27, 37 prevent the guitar 202 from sliding any further forward. Finally, irrespective of the instrument that is received in and supported by the exemplary guitar stand, the various protective strips 29, 39, 45, 55 may provide additional frictional support and also prevent the guitar stand 10 from damaging the instrument.

Figure 14:
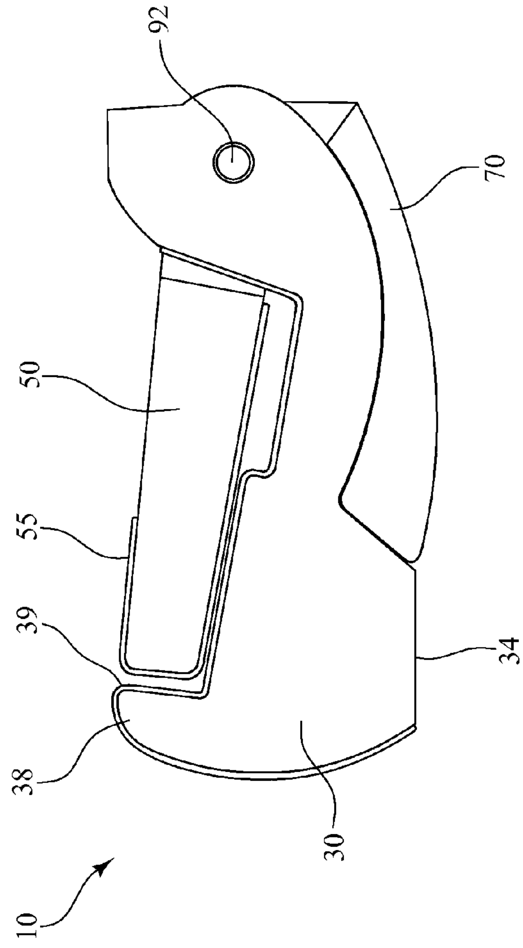
FIG. 14 is a side view of the exemplary guitar stand of FIG. 4 in a storage position.

To return the guitar stand to a storage position, as shown in FIG. 14, the brace 80 is unlocked or released. The two vertical support members 40, 50 (which are hinged together) are folded together into an abutting relationship, and then are rotated downward and are received in the cavity defined above the respective support ledges 26, 27, 36, 37 of the main support legs 20, 30. The rear legs 60, 70 are then rotated toward and into engagement with the respective main supports legs 20, 30. Specifically, the recess 62 defined along the outer surface of the rear leg 60 engages and mates with the complementary recess 22 defined by the main support leg 20, such that the rear leg 60 is nestled into and fits snugly against the main support leg 20. Similarly, the recess 72 defined along the outer surface of the rear leg 70 engages and mates with the complementary recess 32 defined by the main support leg 30, such that the rear leg 70 is nestled into and fits snugly against the main support leg 30.

Figure 1:
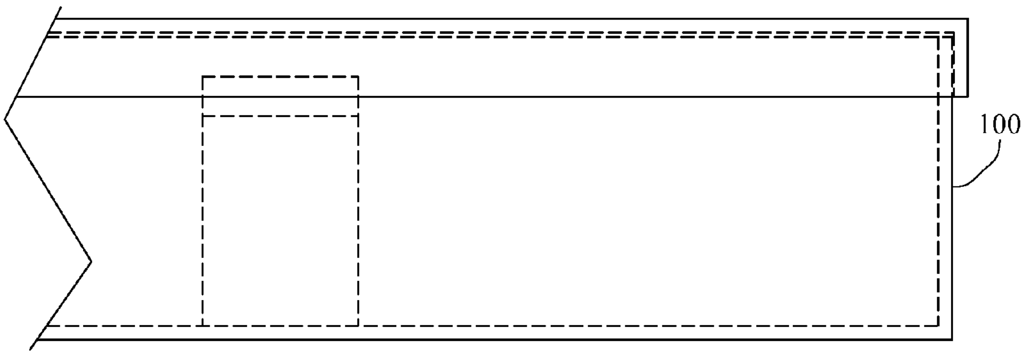
FIG. 1 is a partial side view of a guitar case.
Figure 2:
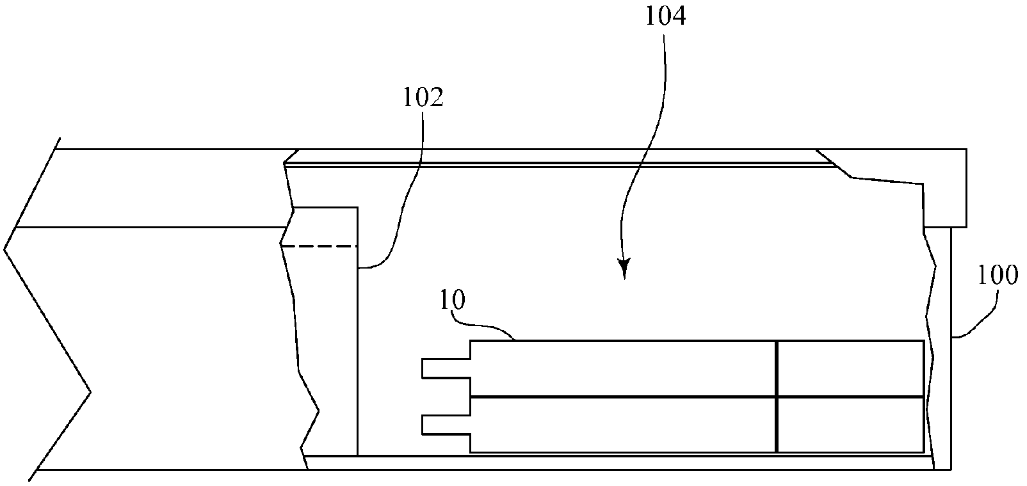
FIG. 2 is another partial side view of the guitar case of FIG. 1, with an exemplary guitar stand made in accordance with the present invention placed in the guitar case in a storage position.
Figure 3:
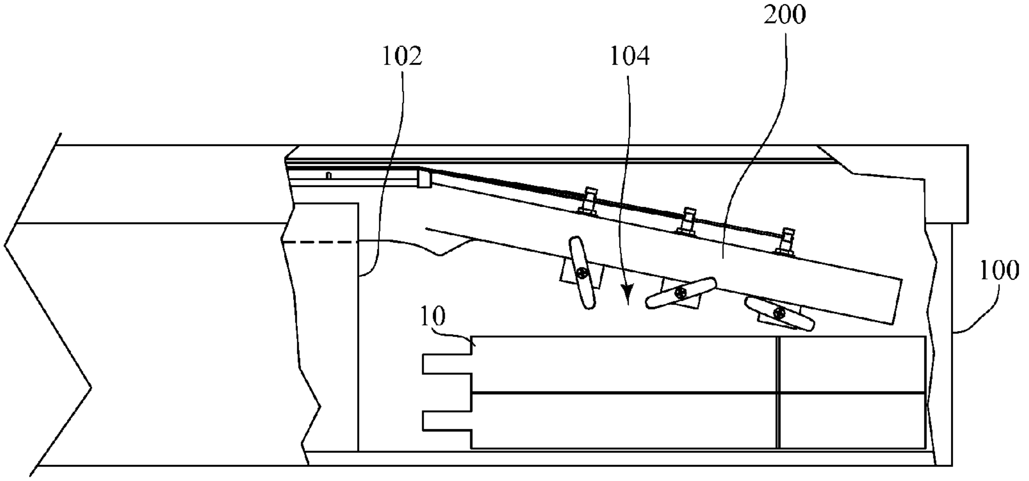
FIG. 3 is another partial side view of the guitar case of FIG. 1, with an exemplary guitar stand made in accordance with the present invention placed in the guitar case in a storage position, and with a guitar then placed in the guitar case.

Once in the storage position, and referring now to FIGS. 2-3, the exemplary foldable guitar stand 10 can fit in the space 104 that is in front of the neck support 102 and under the headstock of the guitar 200 when it is stored in the guitar case 100. Even with the guitar stand 10 stowed in the guitar case 100, there remains sufficient room for the headstock of the guitar 200.

Finally, it should be recognized that a guitar stand made in accordance with the present invention has a minimal number of moving parts, is compact and portable, has excellent strength and stability, and has no sharp edges or other parts that could damage the guitar. It has a wide stance with a low center of gravity and incorporates the body weight and dimensions of the guitar as a further stabilizer. Finally, the guitar stand will allow for support of a guitar with electrical connections, as the angled electrical jack on the bout of guitars will not be obstructed by the guitar stand.

One of ordinary skill in the art will recognize that additional embodiments are also possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A foldable guitar stand, comprising:

a first main support leg including a proximate end defining a hole;

a first vertical support member including a proximate end defining a hole;

a first rear leg including a proximate end defining a hole, with the respective holes defined by the first main support leg, the first vertical support member, and the first rear leg placed in registry with one another and accommodating a first pin to facilitate pivotal movement of the first main support leg, the first vertical support member, and the first rear leg relative to each other about a common axis defined by the first pin, such that the first main support leg, the first vertical support member, and the first rear leg can be rotated to configure the guitar stand in a storage position or a deployed position;

a second main support leg including a proximate end defining a hole;

a second vertical support member including a proximate end defining a hole;

a second rear leg including a proximate end defining a hole, with the respective holes defined by the second main support leg, the second vertical support member, and the second rear leg placed in registry with one another and accommodating a second pin to facilitate pivotal movement of the second main support leg, the second vertical support member, and the second rear leg relative to each other about a common axis defined by the second pin, such that the second main support leg, the second vertical support member, and the second rear leg can be rotated to configure the guitar stand in the storage position or the deployed position; and a hinge that operably joins the first vertical support member to the second vertical support member.

2. The foldable guitar stand as recited in claim 1, wherein, in the storage position, the first vertical support member is received in a cavity defined by the first main support leg, and the second vertical support member is and received in a cavity defined by the second main support leg.

3. The foldable guitar stand as recited in claim 2, wherein, in the storage position, the first rear leg engages the first main support leg, and the second rear leg engages the second main support leg.

4. The foldable guitar stand as recited in claim 3, wherein, in the storage position, a recess defined along an outer surface of the first rear leg engages and mates with a complementary recess defined along an inner surface of the first main support leg, such that the first rear leg is nestled into and fits snugly against the first main support leg, and a recess defined along an outer surface of the second rear leg engages and mates with a complementary recess defined along an inner surface of the second main support leg, such that the second rear leg is nestled into and fits snugly against the second main support leg.

5. The foldable guitar stand as recited in claim 1, wherein, in the storage position, the first vertical support member and the second vertical support member are folded together into an abutting relationship.

6. The foldable guitar stand as recited in claim 4, wherein, in the storage position, the first vertical support member and the second vertical support member are folded together into an abutting relationship.

7. The foldable guitar stand as recited in claim 1, wherein, in the deployed position, the first main support leg is rotated to a position in which a substantially flat foot portion at a distal end of the first main support leg can engage an underlying ground surface, and the second main support leg is similarly rotated to a position in which a substantially flat foot portion at a distal end of the second main support leg can also engage the underlying ground surface.

8. The foldable guitar stand as recited in claim 7, wherein, in the deployed position, the first rear leg is rotated away from the first main support leg to a position in which a foot portion of the first rear leg can engage the underlying ground surface, and the second rear leg is rotated away from the second main support leg to a position in which a foot portion of the second rear leg can also engage the underlying ground surface.

9. The foldable guitar stand as recited in claim 1, wherein, in the deployed position, the first vertical support member and the second vertical support member are rotated into an upright orientation.

10. The foldable guitar stand as recited in claim 9, wherein the first vertical support member defines a surface that is configured to engage a corresponding surface defined by the first main support leg at its proximate end, and the second vertical support member similarly defines a surface that is configured to engage a corresponding surface defined by the second main support leg at its proximate end, thus locking the first vertical support member and the second vertical support member into the upright orientation when the foldable guitar stand is in the deployed position.

11. The foldable guitar stand as recited in claim 1, and further comprising a brace that extends between and connects the first vertical support member to the second vertical support member.

12. The foldable guitar stand as recited in claim 1, wherein the first main support leg defines at least two support ledges along its upper surface, and the second main support leg defines at least two corresponding support ledges along its upper surface.

13. The foldable guitar stand as recited in claim 12, wherein the first main support leg defines a stop along its upper surface at its distal end, and the second main support leg defines a corresponding stop along its upper surface at its distal end.

14. The foldable guitar stand as recited in claim 12, and further comprising one or more protective strips applied to the respective support ledges of the first main support leg and the second main support leg.

15. The foldable guitar stand as recited in claim 1, and further comprising one or more protective strips applied to the first vertical support member and the second vertical support member.

16. A foldable guitar stand, comprising:

a first subassembly including a first main support leg, a first vertical support member, and a first rear leg; and a second subassembly including a second main support leg, a second vertical support member, and a second rear leg;

wherein the first main support leg, the first vertical support member, and the first rear leg of the first subassembly are mounted for pivotal movement relative to each other about a common axis defined by a first pin;

wherein the second main support leg, the second vertical support member, and the second rear leg of the first subassembly are mounted for pivotal movement relative to each other about a common axis defined by a second pin;

wherein the first subassembly and the second subassembly are operably joined together by a hinge that connects the first and second vertical support members; and wherein said foldable guitar stand can be manipulated from a storage position to a deployed position.

17. The foldable guitar stand as recited in claim 16, wherein, in the storage position, the first vertical support member is received in a cavity defined by the first main support leg, and the second vertical support member is received in a cavity defined by the second main support leg.

18. The foldable guitar stand as recited in claim 17, wherein, in the storage position, a recess defined along an outer surface of the first rear leg engages and mates with a complementary recess defined along an inner surface of the first main support leg, such that the first rear leg is nestled into and fits snugly against the first main support leg, and a recess defined along an outer surface of the second rear leg engages and mates with a complementary recess defined along an inner surface of the second main support leg, such that the second rear leg is nestled into and fits snugly against the second main support leg.

19. The foldable guitar stand as recited in claim 16, wherein, in the storage position, the first vertical support member and the second vertical support member are folded together into an abutting relationship.

20. The foldable guitar stand as recited in claim 16, wherein, in the deployed position, the first main support leg is rotated to a position in which a substantially flat foot portion at a distal end of the first main support leg can engage an underlying ground surface, and the second main support leg is similarly rotated to a position in which a substantially flat foot portion at a distal end of the second main support leg can also engage the underlying ground surface.

21. The foldable guitar stand as recited in claim 20, wherein, in the deployed position, the first rear leg is rotated away from the first main support leg to a position in which a foot portion of the first rear leg can engage the underlying ground surface, and the second rear leg is rotated away from the second main support leg to a position in which a foot portion of the second rear leg can also engage the underlying ground surface.

22. The foldable guitar stand as recited in claim 21, wherein, in the deployed position, the first vertical support member and the second vertical support member are rotated into an upright orientation.

23. The foldable guitar stand as recited in claim 16, and further comprising a brace that extends between and connects the first vertical support member to the second vertical support member.

* * * * *